Patented Apr. 27, 1954

2,676,923

UNITED STATES PATENT OFFICE 2,676,923

PURIFICATION OF HYDROGEN PEROXIDE

James H. Young, Niagara Falls, N. Y., assignor to E. I. du Pont de Nemours and Company, Wilmington, Del., a corporation of Delaware No Drawing. Application June 24, 1950,
Serial No. 170,245

6 Claims. (Cl. 210—24)

This invention relates to the purification of aqueous hydrogen peroxide solutions and particularly to a method for removing heavy metal impurities therefrom.

Various methods have been proposed for removing heavy metal impurities from hydrogen peroxide, which impurities, though present in small concentrations, actively catalyze decomposition of the peroxide. It has long been known that small concentrations of metallic ions such as those of iron, copper, nickel, lead, chromium or manganese, in hydrogen peroxide are undesirable and may render the peroxide solution entirely unsatisfactory and even unsafe for storage. One of the most effective methods proposed for removing such ions is that described in Hawkinson U. S. Patent 2,017,440. It involves the precipitation in the solution to be purified of stannic hydroxide which acts as a collector for such impurities and is subsequently removed, together with the collected impurities, from the solution by filtration. Excellent results are obtained. However, the method is most effectively carried out batchwise, which is disadvantageous, and requires the use of rather elaborate and carefully tended filters.

It is an object of this invention to provide an improved method of purifying hydrogen peroxide solutions which is rapid, highly effective and may be carried out in a continuous manner employing simple equipment. A further object is to provide an effective purification method involving the use of ion-exchange resins. Further objects will be apparent from the following description of the invention.

The suggestion has been made that ion-exchange resins might be useful for purifying hydrogen peroxide. It has been discovered, however, that ion-exchange resins as generally used, e. g., in the demineralization of water, are of no practical use in purifying hydrogen peroxide and that their use can be exceedingly dangerous and lead to explosions, particularly when purification of concentrated solutions, e. g., at least 25% $H_2O_2$, is involved. Furthermore, it has been discovered that only under certain carefully controlled conditions can cation-exchange resins of a few specific types be successfully employed.

The cation-exchange resins which have been found to be suitable for use for the present purpose are those of the aromatic hydrocarbon polymer type containing nuclear sulfonic acid groups as the ion-active group. Particularly suitable are the nuclear sulfonated polymerizates of vinyl aromatic compounds. Examples of such resins are the sulfonated, cross-linked polymerizates of poly-vinyl aryl compounds, or of mixtures of poly-vinyl aryl compounds with mono-vinyl aryl compounds, described in D'Alelio U. S. Patent 2,366,007. However, even these resins are not suitable for use in the form in which they are sold commercially, since to be suitable for the present purpose they must be subjected to a "conditioning" treatment whereby they are converted to the hydrogen form and heavy metal constituents are completely or substantially completely removed.

Accordingly, the objects of the invention are realized by contacting aqueous hydrogen peroxide solutions which are to be purified with a nuclear sulfonated aromatic hydrocarbon type cation-exchange resin which has been conditioned previously by treatment with an aqueous solution of a strong acid until the resin has been converted to the hydrogen form and the amount of heavy metal ions bound by the resin has been reduced to below that equivalent to 0.01 of the theoretical ferric ion binding capacity of the resin. The pH of the solution being purified should be between about 0 and 3.6 and use of the resin should be discontinued, or the resin should be regenerated, when the amount of heavy metal ions removed from the solution has increased the heavy metal ions bound by the resin to an amount equivalent to not more than 0.01 of the theoretical ferric ion binding capacity of the resin. Purification in this manner has been found to be highly effective and practicable.

The invention is further illustrated by the following examples.

*Example 1*

A column of "Dowex-50" resin, a commercially available nuclear sulfonated aromatic hydrocarbon type cation-exchange resin, described in U. S. Patent 2,366,007 and in Ind. Eng. Chem. 40, 1350 (1948), was conditioned for use by continuous washing with a 10% sulfuric acid solution until the acid effluent from the column gave a negative test for iron with potassium thiocyanate and the resin was completely converted to the acid form. The column of resin was then washed with water until the effluent water gave a negative test for sulfate ion with barium chloride.

160 g. of the conditioned resin was placed in a 3-in. diameter glass tube on top of a glass wool support which in turn was supported by a layer of ceramic Berl saddles. The tube and support materials were thoroughly cleaned with acid before use. A crude aqueous 35% hydrogen peroxide solution produced by an electrolytic process and having a pH within the range 0.7 to 1.5 was allowed to flow continuously at about room temperature downwardly through the column of conditioned resin at a rate of about 1 ml. of solution per gram of resin per minute. The pH is that measured by glass electrodes with a Beckman pH meter at 25° C. The solution as it flowed from the bottom of the tube was collected in clean receivers for testing. The flow of solution through the column was discontinued before the heavy metal impurities removed from the solution by ion-exchange with the resin reached the equivalent of 0.01 of the theoretical ferric ion binding capacity of the resin. The resin was then regenerated for reuse by washing with 10% sulfuric acid until the acid effluent again gave a negative test for ferric ion, followed by washing with water until the washings gave a negative test for sulfate ion. Seven 300 ml. portions of 10% $H_2SO_4$ were used in sequence. Analysis of the peroxide solution before and after passage through the resin column showed no loss in active oxygen due to contact with the resin.

Stability tests established that samples of the above crude hydrogen peroxide solution before passage through the resin column were completely decomposed in 10 to 15 hours at 100° C. In contrast, various sample cuts of the peroxide solution after passage through the resin column showed losses of only 0.5 to 3.0% of their active oxygen contents in 15 hours, at 100° C. Portions of the purified product were stabilized by the addition of sodium stannate and sodium pyrophosphate (as described in Reichert U. S. Patent 1,958,204) in amounts corresponding to 0.13 and 0.10 g./l., respectively. These purified, stabilized samples showed excellent stabilities over a pH range of 1.5 to 4.5, the active oxygen losses in 15 hours at 100° C. ranging from 0.2 to 0.7%.

*Example 2*

A crude 35% hydrogen peroxide solution obtained by an electrolytic process was purified as described in Example 1 using a "Dowex-50" resin which had been conditioned with 10% sulfuric acid prior to use as described in the above example. Approximately 2,100 parts by weight of solution were purified per 1 part of resin before the amount of heavy metal ions removed by the resin was equivalent to 0.01 of the theoretical ferric ion binding capacity of the resin. The stability of the purified solution was equivalent to not more than a 1% loss of active oxygen in 15 hrs. at 100° C. It has not been established how many times the resin may be satisfactorily regenerated and reused but laboratory tests have indicated that the resin can be used in this manner to purify satisfactorily at least, and probably much more than, 5,000 times its weight of crude hydrogen peroxide.

Iron is not the only objectionable heavy metal ion removed from the hydrogen peroxide by the present method. Thus, as is shown in Example 3, lead, copper, nickel and manganese ions are also removed when present.

*Example 3*

Crude 35% hydrogen peroxide solution was purified as described in Example 1, after which the cation-exchange resin used was extracted with 10% sulfuric acid. Seven 300 ml. portions of 10% acid were used in the extraction, the successive portions removing from the 160 g. of resin, 7.5, 19.5, 16.5, 13.5, 6.0, 4.5 and 1.5 mg. of iron. Approximately 83% of the iron was removed in the first four washings. In a similar experiment the 10% acid used to extract 160 g. of used resin was found to have removed from the resin the following heavy metals in the amounts indicated.

| Metal | Mg. Found | P. P. M. Removed from Peroxide |
|---|---|---|
| Iron | 93.8 | 0.252 |
| Lead | 21.2 | 0.057 |
| Copper | 2.1 | 0.006 |
| Manganese | 1.3 | 0.003 |
| Nickel | 10.5 | 0.028 |

*Example 4*

200 g. of "Dowex-50" resin was conditioned as described in Example 1. Crude 70% hydrogen peroxide solution was passed downwardly through a column of the conditioned resin in a 2.5-in. diameter glass tube at a flow rate of 150–200 ml./min. The stability of the unpurified material corresponded to an active oxygen loss of around 3 to 16% in 16 hrs. at 100° C., whereas the purified (but unstabilized) material showed active oxygen losses on the order of 0.4 to 1.5% under the same test conditions.

*Example 5*

A crude unstabilized 13% hydrogen peroxide solution, obtained from an anthraquinone process for producing $H_2O_2$, was purified at a pH of 3.0 with "Dowex-50" resin in the general manner described in Example 1, except that the resin was preconditioned with 12% hydrochloric acid instead of sulfuric acid. After treatment with the resin, the peroxide solution was stabilized by addition of 0.1 g. per liter each of sodium pyrophosphate and sodium stannate. The purified, stabilized product showed an active oxygen loss of 1.4% during 16 hrs. at 100° C. The same crude solution which had not been treated with the resin but which had been stabilized in the same way showed an active oxygen loss of 2.6% under the same test conditions.

*Example 6*

A crude unstabilized 37% hydrogen peroxide solution, obtained from an anthraquinone process for producing hydrogen peroxide, was purified at a pH of 2.6 as described in Example 5. The active oxygen loss of the purified product, after stabilization with approximately 0.1 g. per liter each of sodium stannate and sodium pyrophosphate, was 1.05% during 16 hrs. at 100° C. The crude material which had not been treated with the resin but which had been stabilized in the same way lost 22% of its active oxygen under the same test conditions.

Most ion-exchange materials are not suitable for use in purifying hydrogen peroxide since they either accelerate peroxide decomposition or are attacked by concentrated hydrogen peroxide, or both. Inorganic Zeolites and carbonaceous ion-exchange products, such as are obtained by the sulfonation of coal, are definitely unsuitable. The sulfonated phenolaldehyde type resins are attacked by concentrated hydrogen peroxide. The only cation-exchange resins which have been found to be highly effective in removing heavy metal ions from hydrogen peroxide solutions, and which do not cause peroxide decomposition and are stable toward concentrated hydrogen peroxide, are the nuclear sulfonated hydrocarbon type resins mentioned previously. Even these resins must be used on a hydrogen cycle, instead of the usual sodium or ammonium cycle, and must be conditioned before their use is satisfactory. Moreover, for the purification treatment to be effective, the pH of the hydrogen peroxide solution which is to be purified must be between about 0 to 3.6 which is lower than the pH generally used in ion-exchange practices. If the pH, as measured by using a Beckman pH meter and glass electrodes, is lower than 0 heavy metal ion removal is not effective, in fact, if the acidity is increased substantially beyond the value corresponding to pH 0, instead of such ions being removed from the solution by the resin, they are given up by the resin to the solution. If the pH of the solution is substantially higher than about 3.6, the effectiveness of the resin to remove heavy metal ions is impaired, perhaps because at least some of the metal impurities are present, at such higher pH values, as hydroxides which foul the resin. The preferred pH range is about pH 0.7 to about 2.5. Adjustments in pH are preferably made by additions of either sulfuric acid or ammonium hydroxide.

The theoretical cation binding capacity of the resin can be calculated from its content of sulfonic acid groups. Thus, "Dowex-50" resin has a sulfur content of about 8.9% which corresponds to 22.5%-$SO_3H$ or a theoretical ferric ion binding capacity of 5.2% of its weight. In most cation-exchange operations, the exchange resin requires regeneration only after 50% or more of its theoretical cation binding capacity has been utilized. However, for the purification of hydrogen peroxide solutions with the above resins it has been found that effective purification is not realized if more than about 0.01 of the theoretical heavy metal binding capacity, calculated in terms of ferric ion, has been utilized. Accordingly, the resin must initially be conditioned so that more than about 0.99 of its theoretical capacity is available and must be regenerated when not more than about 0.01 of its capacity has been utilized. Regeneration at this exchange level is also important from the standpoint of peroxide and resin stability, since resins with high contents of bound heavy metals actively catalyze peroxide decomposition and reaction of the peroxide with the resin. If the amount of bound impurities is sufficiently high, contact of concentrated peroxide solutions with the resin may even be dangerous. For example, 35% hydrogen peroxide solution will react with resin heavily contaminated with iron. The reaction is exothermic, evolves gas and is therefore potentially dangerous. However, it has been found that when the resin is regenerated as indicated no substantial decomposition of peroxide or reaction of peroxide with the resin occurs and in the examples given no measurable loss of active oxygen occurred during the purification treatment.

A rough but practical way of determining when a resin being used requires regeneration is to treat a sample of the resin with twice its weight of 10% sulfuric acid, letting the mixture stand 10 minutes. The acid is then drained from the resin and its iron content determined by the well-known potassium thiocyanate colorimetric method. When the iron content of the acid exceeds about 30 p. p. m. Fe, regeneration of the resin is required. Preferably the resin is regenerated before the Fe content of the acid in the above test exceeds 15 p. p. m. This same test may be used to determine whether a resin, before initial use or during regeneration, has been properly conditioned. If properly conditioned, the acid in the above test will have an ion content substantially less than 30 p. p. m., generally not over 5 p. p. m., and preferably about 0 to 1 p. p. m.

The conditioning treatment by which the resin as it is obtained commercially, or resin which has been used and requires regeneration, is rendered suitable for use involves washing the resin with an aqueous solution of a strong acid until the resin has been converted to the hydrogen stage and heavy metal impurities have been completely or substantially completely removed as indicated above. Hydrochloric, nitric, phosphoric, and sulfuric acids are suitable and generally will be used in concentrations of about 2-20% by weight. The use of sulfuric acid is preferred. A convenient way of carrying out the conditioning treatment is to pass the acid through a fixed bed of the resin until the effluent acid shows a negative test for ion by the potassium thiocyanate method. Preferably, although not necessarily, the acid-treated resin is washed with water to free it of excess acid before being used. Thus, in the preferred method, the resin which has been conditioned with sulfuric acid is washed with water until the washings are free of sulfate ion so that the purified peroxide will not be unduly contaminated with sulfate.

Contact of the hydrogen peroxide solution which is to be purified with the conditioned resin may be effected in any of the ways employed in the usual cation-exchange methods. It is generally most convenient to pass the solution downwardly through a fixed bed of the resin. Contact time is not critical since the exchange reaction occurs rapidly and a longer contact time than necessary is usually not harmful. The temperature during contact also is not especially critical and any temperature from the freezing point of the solution up to the maximum normally used in processing such solutions, e. g., about 40° C., may be employed effectively. Ordinary temperatures, e. g., 20 to about 30° C., are entirely satisfactory and are preferred.

The present method is effective in purifying aqueous hydrogen peroxide solutions of practically any strength but its use to purify concentrated solutions, i. e., at least 25%, appears to be most practical. With solutions of concentrations up to about 50% $H_2O_2$ by weight there appears to be no special or unusual handling problems involved. However, with more concentrated solutions, e. g., 70 to 90%, which can explode because of their low water content, it is advisable to provide means, such as cooling jackets, for preventing any chance temperature rise. As an extra safety precaution it is recommended that means also be provided for rapidly flooding the system with water in the event any substantial temperature rise is noted in any part of the system. While, as indicated, some hazards may be involved in applying the method to solutions of 70-90% strength, such solutions must always be handled judiciously and by so handling them they have been successfully purified by the present method. However, the method will find most practical use in the purification of solutions of lower strength, particularly solutions of about 25 to 50% strength.

As will be apparent to those skilled in the handling of hydrogen peroxide solutions, all equipment should be thoroughly cleaned before use. Equipment made of ceramicware, glass or stainless steel is suitable. Lead equipment, even lead-lined tanks such as are commonly used to store dilute sulfuric acid, should not be used since contamination of the resin or peroxide with excessive amounts of heavy metals can be exceedingly dangerous as has been indicated.

I claim:

1. A method of removing heavy metal ion impurities from an aqueous hydrogen peroxide solution containing at least 25% $H_2O_2$ by weight comprising washing a nuclear sulfonated aromatic hydrocarbon cation-exchange resin with an aqueous solution of a strong mineral acid until the iron test value of said resin is substantially less than 30 p. p. m. Fe, contacting said hydrogen peroxide solution at a pH of 0 to 3.6 with said washed resin, and discontinuing said contact before the iron test value of the resin in contact with said hydrogen peroxide solution has exceeded 30 p. p. m. Fe; said iron test value being the Fe content of a 10% sulfuric acid solution after it has been in contact for 10 minutes with one-half its weight of a test sample of said resin.

2. The method of claim 1 wherein the washed resin prior to being contacted with the hydrogen peroxide solution has an iron test value substantially less than 15 p. p. m. Fe and contact thereof with said hydrogen peroxide solution is discontinued before the iron test value of the resin exceeds 15 p. p. m. Fe.

3. The method of claim 1 wherein the test value of the used resin is reduced substantially below 30 p. p. m. Fe by washing with an aqueous solution of a strong mineral acid and the resin is then reused.

4. The method of claim 1 wherein the acid employed in washing the resin is sulfuric acid.

5. The method of claim 1 wherein the resin used is a nuclear sulfonated polymerizate of a vinyl aromatic hydrocarbon.

6. A method of removing heavy metal ion impurities from an aqueous hydrogen peroxide solution containing at least 13% $H_2O_2$ by weight comprising washing a nuclear sulfonated aromatic hydrocarbon cation-exchange resin with an aqueous solution of a strong mineral acid until the iron test value of said resin is substantially less than 30 p. p. m. Fe, contacting said hydrogen peroxide solution at a pH of 0 to 3.6 with said washed resin, and discontinuing said contact before the iron test value of the resin in contact with said hydrogen peroxide solution has exceeded 30 p. p. m. Fe; said iron test value being the Fe content of a 10% sulfuric acid solution after it has been in contact for 10 minutes with one-half its weight of a test sample of said resin.

References Cited in the file of this patent

UNITED STATES PATENTS

| Number | Name | Date |
|---|---|---|
| 2,104,501 | Adams et al. | Jan. 14, 1938 |
| 2,198,378 | Ellis | Apr. 23, 1940 |
| 2,366,007 | D'Alelio | Dec. 26, 1944 |
| 2,373,547 | D'Alelio | Apr. 10, 1945 |
| 2,404,367 | Durant et al. | July 23, 1946 |

OTHER REFERENCES

Inorganic and Theoretical Chemistry, vol. 1, 1922, pages 936 and 937.